US010244032B2

(12) United States Patent
Rao et al.

(10) Patent No.: US 10,244,032 B2
(45) Date of Patent: Mar. 26, 2019

(54) REDUCING APPLICATION DETECTION NOTIFICATION TRAFFIC

(71) Applicant: Juniper Networks, Inc., Sunnyvale, CA (US)

(72) Inventors: Anand Narayanan Rao, Bangalore (IN); Prasad Chigurupati, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 300 days.

(21) Appl. No.: 14/810,813

(22) Filed: Jul. 28, 2015

(65) Prior Publication Data

US 2016/0359947 A1    Dec. 8, 2016

(30) Foreign Application Priority Data

Jun. 4, 2015 (IN) .......................... 2804/CHE/2015

(51) Int. Cl.
*H04L 29/08* (2006.01)
*H04L 12/859* (2013.01)
*H04L 12/813* (2013.01)
*H04L 12/14* (2006.01)
*H04M 15/00* (2006.01)
(Continued)

(52) U.S. Cl.
CPC ............ *H04L 67/025* (2013.01); *H04L 12/14* (2013.01); *H04L 12/1403* (2013.01); *H04L 12/1407* (2013.01); *H04L 47/20* (2013.01); *H04L 47/2475* (2013.01); *H04L 67/22* (2013.01); *H04L 67/28* (2013.01); *H04M 15/00* (2013.01); *H04M 15/66* (2013.01); *H04M 15/83* (2013.01);
(Continued)

(58) Field of Classification Search
None
See application file for complete search history.

(56) References Cited

U.S. PATENT DOCUMENTS 8,050,275 B1 * 11/2011 Iyer ..................... H04L 12/2876
370/395.21
8,547,480 B1 * 10/2013 Brown ............... H04N 21/4307
348/500
(Continued)

OTHER PUBLICATIONS

Calhoun et al., "Diameter Base Protocol," RFC 3588, Network Working Group, The Internet Society, Sep. 2003, 147 pp.
(Continued)

*Primary Examiner* — Aaron N Strange
*Assistant Examiner* — James A Edwards
(74) *Attorney, Agent, or Firm* — Shumaker & Sieffert, P.A.

(57) ABSTRACT

In one example, a gateway device includes one or more processors configured to determine that a subscriber device has started a first application, determine that the subscriber device has ended a second application, and send a message, in accordance with Diameter protocol, to a policy server device indicating both that the subscriber device has started the first application and that the subscriber device has ended the second application. In another example, a gateway device includes one or more processors configured to send at most one message, in accordance with Diameter protocol, to a policy server device indicating that a subscriber device has started an application, and at most one message, in accordance with the Diameter protocol, indicating that the subscriber device has stopped the application.

37 Claims, 5 Drawing Sheets (51) Int. Cl.
*H04W 4/24* (2018.01)
*H04L 12/26* (2006.01)
*G06F 15/16* (2006.01)

(52) U.S. Cl.
CPC ........... *H04M 15/854* (2013.01); *H04W 4/24* (2013.01); *G06F 15/16* (2013.01); *H04L 43/026* (2013.01)

(56) References Cited

U.S. PATENT DOCUMENTS

| | | | | |
|---|---|---|---|---|
| 2008/0198871 | A1* | 8/2008 | Shahidi | H04W 76/068 370/465 |
| 2011/0225113 | A1* | 9/2011 | Mann | G06F 9/52 706/47 |
| 2012/0246325 | A1* | 9/2012 | Pancorbo Marcos | H04L 63/102 709/227 |
| 2012/0315932 | A1* | 12/2012 | Spann | G06Q 10/10 455/466 |
| 2013/0066974 | A1* | 3/2013 | Yoakum | H04L 65/1069 709/205 |
| 2016/0182619 | A1* | 6/2016 | Mann | H04L 67/104 726/12 |

OTHER PUBLICATIONS

Fajardo et al., "Diameter Base Protocol," RFC 6733, Internet Engineering Task Force (IETF), Oct. 2012, 152 pp.

Hakala et al., "Diameter Credit-Control Application," RFC 4006, Network Working Group, The Internet Society, Aug. 2005, 115 pp.

"Technical Specification Group Core Network and Terminals; Policy and charging Control (PCC); Reference Points," 3GPP TS, Release 13, 3rd Generation Partnership Project, LTE, Jun. 2015, 228 pp.

Barton, "Gx interface—sitting between PCRF and PCEF," LTE and Beyond, Jan. 18, 2012, 6 pp.

"Policy and Charging Control (PCC); Reference Points," version 13.3.0, 3rd Generation Partnership Project (3GPP), Sep. 9, 2015, retrieved from www.3gpp.org/DynaReprot/29212.htm on Aug. 1, 2017, 237 pp.

\* cited by examiner

REDUCING APPLICATION DETECTION NOTIFICATION TRAFFIC

This application claims the benefit of India Patent Application 2804/CHE/2015, filed Jun. 4, 2015, the entire contents of which are hereby incorporated by reference.

TECHNICAL FIELD

This disclosure relates to computer networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile access networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile access network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

SUMMARY

In general, this disclosure describes techniques related to reducing control traffic exchanged between a policy control server device (which may implement a policy and charging rules function (PCRF)) and a gateway device (which may implement a policy and charging enforcement function (PCEF) and/or a traffic detection function (TDF)). In particular, the gateway device sends messages to the policy control server device indicating when subscriber devices start and/or end applications. That is, the gateway device may detect the starts and ends of applications based on analysis of packet flows of the applications that are associated with a subscriber device. In some examples, rather than sending individual messages per start or end of each application for a subscriber device, the gateway device may send a single message indicating a start of at least one application and an end of at least one application for the subscriber device. In some examples, which may be in addition to or in the alternative to the examples discussed above, the gateway device sends a single start message and a single end message per subscriber device and application, e.g., when the application is associated with multiple packet flows. That is, rather than sending start and end messages for each packet flow associated with a particular application and the subscriber device, the gateway device may send a single start message when the first (i.e., ordinal first) packet flow for the application starts and a single end message when the last (i.e., ordinal last) packet flow for the application ends. In this manner, the techniques of this disclosure may reduce control traffic between the gateway device and the policy control server device, which may alleviate processing demands placed on both devices.

In one example, a method includes, by a gateway device: determining that a subscriber device has started a first application, determining that the subscriber device has ended a second application, and sending a message, in accordance with Diameter protocol, to a policy server device indicating both that the subscriber device has started the first application and that the subscriber device has ended the second application.

In another example, a gateway device includes one or more processors configured to determine that a subscriber device has started a first application, determine that the subscriber device has ended a second application, and send a message, in accordance with Diameter protocol, to a policy server device indicating both that the subscriber device has started the first application and that the subscriber device has ended the second application.

In another example, a method includes, by a gateway device: determining that a subscriber device has started an application in an ordinal first packet flow associated with the subscriber device and the application, sending a message, in accordance with Diameter protocol, to a policy server device indicating that the subscriber device has started the application, determining that the subscriber device has started the application in one or more subsequent packet flows associated with the subscriber device and the application, and based on the one or more subsequent packet flows being subsequent to the ordinal first packet flow, abstaining from sending messages, in accordance with the Diameter protocol, indicating that the subscriber device has started the application in the subsequent packet flows.

In another example, a gateway device includes one or more processors configured to determine that a subscriber device has started an application in an ordinal first packet flow associated with the subscriber device and the application, send a message, in accordance with Diameter protocol, to a policy server device indicating that the subscriber device has started the application, determine that the subscriber device has started the application in one or more subsequent packet flows associated with the subscriber device and the application, and based on the one or more subsequent packet flows being subsequent to the ordinal first packet flow, abstaining from sending messages, in accordance with the Diameter protocol, indicating that the subscriber device has started the application in the subsequent packet flows.

The details of one or more examples are set forth in the accompanying drawings and the description below. Other features, objects, and advantages will be apparent from the description and drawings, and from the claims.

DETAILED DESCRIPTION

Figure 1:
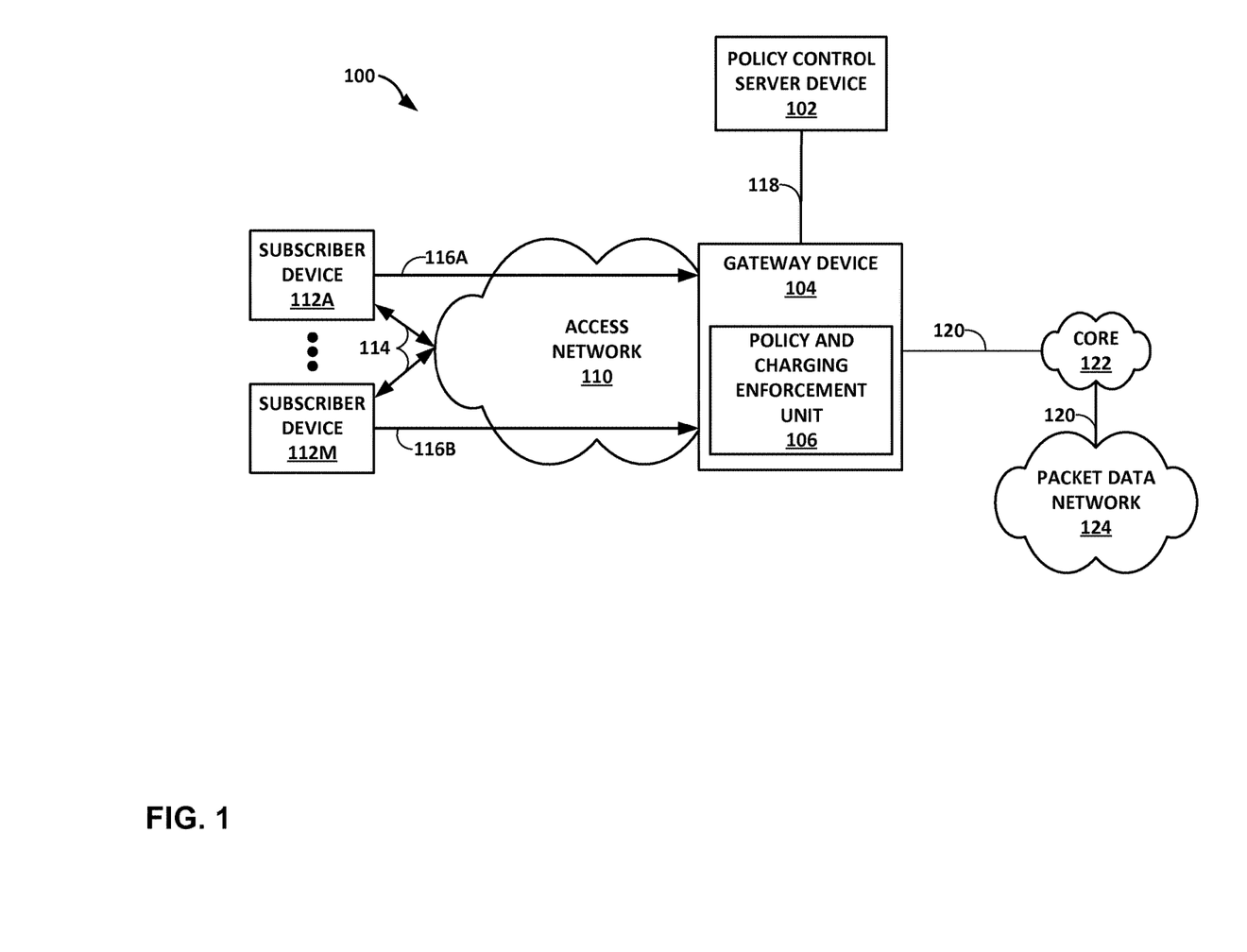
FIG. 1 is a block diagram illustrating an example network system that may reduce Diameter protocol traffic according to techniques described in this disclosure.

FIG. 1 is a block diagram illustrating an example network system 100 that may reduce Diameter traffic according to techniques described in this disclosure. Network system 100 includes packet data network (PDN) 124 coupled to service provider access network 110 ("access network 110") via access network gateway device 8 ("gateway device 104") for access network 110. Packet data network 124 supports one or more packet-based services that are available for request and use by subscriber devices 112A-112M (collectively, "subscriber devices 112"). As examples, PDN 124 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 124 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 110, an enterprise IP network, or some combination thereof. In various embodiments, PDN 124 is connected to a public WAN, the Internet, or to other networks. Packet data network 124 executes one or more packet data protocols (PDPs), such as IP (IPv4 and/or IPv6), X.25 or Point-to-Point Protocol (PPP), to enable packet-based transport of PDN 124 services.

In some examples, gateway device 104 is a services gateway device or services node upstream from a separate access gateway device (not illustrated in FIG. 1) and logically situated on interface 120 between access network 110 and PDN 124. In some examples, gateway device 104 and a separate access gateway may be different components within a computing device, such as a router. In some examples, the gateway device 104 is a services gateway that determines services to apply to packet flows in accordance with policies received from policy control server device 102. In such examples, the gateway device 104 may direct the packet flows to a services complex along a service chain (not shown in FIG. 1) for application of the determined services for the packet flows.

Subscriber devices 112 connect to gateway device 104 via access network 110 to receive connectivity to subscriber services for applications hosted by subscriber devices 112. Applications hosted by subscriber devices 112 may include VoIP clients, video games, videoconferencing, E-mail, and Internet browsers, among others. Each of subscriber devices 112 may represent, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services provided by PDN 124. A subscriber may represent, for instance, an enterprise, a residential subscriber, or a mobile subscriber. Subscriber devices 112 connect to access network 110 via access links 114 that comprise wired and/or wireless communication link. The term "communication link," as used herein, comprises any form of transport medium, wired or wireless, and can include intermediate nodes such as network devices. Each of access links 114 may comprise, for instance, aspects of an asymmetric DSL network, WiMAX, a T-1 line, an Integrated Service Digital Network (ISDN), wired Ethernet, or a cellular radio link.

As explained in greater detail below, gateway device 104 includes policy and charging enforcement unit 106. In general, policy and charging enforcement unit 106 analyzes packet flows associated with subscriber devices 112 to determine when subscriber devices 112 start and/or end the applications discussed above to access the various services discussed above. In response to detection of such an application start or end, gateway device 104 sends messages in accordance with the techniques of this disclosure to policy control server device 102, e.g., for purposes of properly charging subscribers associated with subscriber devices 112 for access to corresponding services or for downloading policies related to the detected application. Such messages may be in accordance with Diameter protocol, which is described in Calhoun et al., "Diameter Base Protocol," Network Working Group, RFC 3588, September 2003, available at tools.ietf.org/html/rfc3588, and in Fajardo et al., "Diameter Base Protocol," Internet Engineering Task Force (IETF), RFC 6733, October 2012, available at tools.ietf.org/html/rfc6733. Credit control in Diameter is described in Hakala et al., "Diameter Credit-Control Application," Internet Engineering Task Force, RFC 4006, August, 2005, available at tools.ietf.org/html/rfc4006. The Gx protocol is described in 3rd Generation Partnership Project; Technical Specification Group Core Network and Terminals; Policy and Charging Control (PCC); Reference points, 3GPP S 29.212 v. 13.2.0 (Rel. 13) June 2015, available at www.3gpp.org/DynaReport/29212.htm.

A network service provider operates, or in some cases leases, elements of access network 110 to provide packet transport between subscriber devices 112 and gateway device 104. Access network 110 represents a network that aggregates data traffic from one or more subscribers for transport to/from core network 122 (illustrated as "core 122" in FIG. 1) of the service provider. Access network 110 includes network nodes (not shown) that execute communication protocols to transport control and user data to facilitate communication between subscriber devices 112 and gateway device 104. Access network 110 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the 3rd Generation Partnership Project (3GPP), 3rd Generation Partnership Project 2 (3GGP/2) and the Worldwide Interoperability for Microwave Access (WiMAX) forum.

Service provider core network 122 (hereinafter, "core network 122") offers packet-based connectivity to subscriber devices 112A-112M attached to access network 110 for accessing PDN 124. Core network 122 may represent a public network that is owned and operated by a service provider to interconnect a plurality of networks, which may include access network 110. Core network 122 may implement Multi-Protocol Label Switching (MPLS) forwarding and in such instances may be referred to as an MPLS network or MPLS backbone. In some instances, core network 122 represents a plurality of interconnected autonomous systems, such as the Internet, that offers services from one or more service providers. PDN 124 may represent an edge network coupled to core network 122, e.g., by a customer edge device such as customer edge switch or router. PDN 124 may include a data center.

In examples of network system 100 that include a cellular access network as access network 110, gateway device 104 may represent a mobile gateway, for example, a Gateway General Packet Radio Service (GPRS) Serving Node (GGSN), an Access Gateway (aGW), and/or a Packet Data Network (PDN) Gateway (PGW). In examples of network system 100 that include a wireline/broadband access network, gateway device 104 may represent a Broadband Services Router (BSR), Broadband Network Gateway (BNG), business provider edge (PE) router, and/or a Broadband Remote Access Server (BRAS), for instance. Interface 120 may represent a Gi and/or SGi interface (or "reference point"). Consequently, elements of core network 122 may in some cases be referred to as an SGi-LAN and/or Gi-LAN. In some instances, gateway device 104 represents a Traffic Detection Function (TDF) device and policy and charging enforcement unit 106 represents the TDF. Either gateway device 104 or a separate TDF device that includes the policy and charging enforcement unit 106 may be referred to as a "policy enforcement device."

A network service provider that administers at least parts of network system 100 offers services to subscribers associated with devices, e.g., subscriber devices 112, that access the service provider network. Services offered may include, for example, traditional Internet access, Voice-over-Internet Protocol (VoIP), video and multimedia services, and security services. As described above with respect to access network 110, core network 122 may support multiple types of access network infrastructures that connect to service provider network access gateways to provide access to the offered services. In some instances, network system may include subscriber devices 112 that attach to multiple different access networks 110 having varying architectures yet all coupled by interface 120 to PDN 124.

Gateway device 104 is a network device that implements policy and charging control (PCC) functionality for access network 110. Policy control server device 102 provisions gateway device 104 by policy interface 118 with one or more policy rules that each specifies a set of information enabling the detection of a service data flow and defining policy control, charging, or application detection parameters for application by network elements of access network 110. Policy control server device 102 may represent a network device that provides a Policy Control and Charging Rules Function (PCRF) for a mobile (e.g., 3GPP) or convergent instance of access network 110 or, alternatively or in addition, a network device that provides a Policy Decision Point (PDP) for a Broadband Policy Control Framework (BPCF) framework for a broadband/wireline instance of access network 110.

Gateway device 104 may generally be configured to perform the techniques of this disclosure, rather than a conventional policy and charging enforcement function (PCEF) and/or a conventional traffic detection function (TDF). Similarly, policy control server device 102 may be configured in accordance with the techniques of this disclosure, rather than a conventional policy and charging rules function (PCRF). In general, application detection and control (ADC) is performed by gateway device 104 over a Gx interface and Sd interface (generally corresponding to interface 118). The ADC functionality allows gateway device 104 to notify policy control server device 102 of detected applications in subscriber traffic (e.g., sets of packet flows 116A and 116B). That is, packet flows 116A represent one or more packet flows associated with subscriber device 112A, while packet flows 116B represent one or more packet flows associated with subscriber device 112M. In response, policy control server device 102 can provision new policies to gateway device 104 (which may represent a packet gateway (PGW) or TDF gateway) to control those applications.

In general, policy control server device 102 (which, for example, executes the PCRF) subscribes to the APPLICATION_START and/or APPLICATION_STOP event triggers (when in Solicited mode; in UnSolicited mode, policy control server device 102 need not subscribe) and provides the Applications (via Application Identifiers (Ids)) to be detected and controlled inside the Charging-Rule-Definition attribute-value pair (AVP) using the TDF-Application-Id AVP, or these rules may be preconfigured.

Whenever gateway device 104 detects the start of an application as mentioned in the rules, gateway device 104 may send a CCR-U message to policy control server device 102 with Event trigger AVP=APPLICATION_START and Application-Detection-Information AVP containing more information about the application detected (such as Application Ids, Flow detected, and Flow instance). The Flow information & instance AVPs are optional and sent only if deducible. Similarly, when a particular application termination is detected, gateway device 104 sends a CCR-U message to policy control server device 102 with Event trigger AVP=APPLICATION_STOP along with Application-Detection-Information AVP.

In conventional techniques, this would mean, for every APPLICATION_START and APPLICATION_STOP event trigger type, a separate CCR-U message has to be sent to notify the PCRF executed by policy control server device 102. However, this disclosure describes various techniques (usable alone or in combination) to reduce the number of messages exchanged between gateway device 104 and policy control server device 102.

In particular, these techniques were motivated by results of heuristic scaling testing. This testing revealed that there is a large amount of CCR-U traffic generated towards the PCRF as executed by policy control server device 102 in the following use cases:

1) A small number of user equipment devices (UEs) starting and stopping a large number of different applications/flows of the same application frequently.
2) A large number of UEs starting and stopping a small number of different applications/flows of the same application frequently.
3) A large number of UEs starting and stopping a large number of different applications/flows of same application frequently.

In general, the total number of CCR-U requests that a device executing a PCEF would send a device executing a PCRF due to application detection, outside of the techniques of this disclosure, is a function of the number of UEs serviced, a number of the applications started/stopped per UE, and a number of flows of each application. This large number of CCR-U traffic may lead to the following problems in conventional techniques:

1) PCRF can be overwhelmed with large number of CCR-U messages from PCEF depending on the number of applications started & stopped & number of subscriber sessions established in PCRF & PCEF. The overall throughput of the PCRF may go down.
2) PCEF can become overloaded with large number of application notifications to be sent to PCRF, which can cause other critical messages processing (internal/external) to be dropped or delayed.

Development of the techniques of this disclosure was therefore in response to a recognized need to address both the potential problems above, which could happen in a real network deployed with application detection and control. As discussed below, this disclosure describes techniques that may reduce application notification traffic sent to policy control server device 102, e.g., by:

1) Sending both APPLICATION_START and APPLICATION_STOP notifications via a single CCR-U message (instead of two separate CCR-Us).
2) Notifying PCRF of start/stop of Application traffic only once for every new application started/stopped by the UE in a given IP connectivity access network (IP-CAN) session. That means, for all the flows of a given application type opened by the UE, the PCRF will be notified of Application Start only once when the first flow is created. Similarly, the PCRF will be notified of Application Stop when the last flow is destroyed.

Policy and charging enforcement unit 106 of gateway device 104, for example, enforces service flow-based policy and charging control according to the policy rules. Policy and charging enforcement unit 106 represents a device, module, component, software library, or combination of the above that applies policy enforcement for access network 110 in accordance with the policy rules provided by policy control server device 102. Policy and charging enforcement unit 106 may in some instances be executed by a device separate from gateway device 104.

Policy interface 118 may represent a Gx and/or Sd interface/reference point. In some instances, the policy rules provided by policy control server device 102 to gateway device 104 include PCC rules and policy and charging enforcement unit 106 represents a Policy and Charging Enforcement Function (PCEF), at least in some example enhanced with Application Detection and Control (ADC). In some instances, the policy rules may also or alternatively include ADC rules and policy and charging enforcement unit 106 represents a Traffic Detection Function (TDF) situated on interface 120 upstream of an access gateway for access network 110. ADC rules may be pre-provisioned in the gateway device 104. ADC may inspect application layer data of packet flows 116A, 116B using, e.g., Deep Packet Inspection (DPI). Each of the ADC rules may include information for identifying the rule, for detecting the start and stop of one or more applications executed by subscriber devices 112, and may also include enforcement actions to be taken by gateway device 104 with respect to matching packet flow data. Enforcement actions may include, e.g., blocking, policing, and rate limiting.

In some instances, policy enforcement module may represent a Policy Decision Point for a BPCF framework. Further details regarding policy and charging controls are found in "3GPP TS 23.203—Policy and Charging Control Architecture (Release 10)," Version 10.1.0, 3rd Generation Partnership Project, Technical Specification Group Services and System Aspects, September 2010; 3GPP TS 29.212—Policy and Charging Control (PCC), Reference Points (Release 11)," Version 11.9.0, July 2013; and 3GPP TS29.213, "Policy and Charging Control signalling flows and Quality of Service (QoS) parameter mapping (Release 13)," Version 13.1.0, 3rd Generation Partnership Project, Technical Specification Group Core Network and Terminals, March 2015, which are each incorporated herein by reference in their entirety.

The application detection and control (ADC) feature receives the request to detect the specified application traffic, to report starts and/or stops of application traffic to the PCRF, and to apply specified enforcement and charging actions.

The application detection and control feature may be implemented either by the TDF or by the PCEF enhanced with ADC.

Two models may be applied, depending on operator requirements: solicited and unsolicited application reporting. The unsolicited application reporting is only supported by the TDF.

In solicited application reporting, the PCRF instructs the TDF, or the PCEF enhanced with ADC, on which applications to detect and whether to report start or stop event to the PCRF by activating the appropriate ADC/PCC rules in the TDF/PCEF enhanced with ADC. Reporting notifications of start and stop of application detection to the PCRF may be muted, in addition, per specific ADC/PCC rules. The PCRF may, in a dynamic ADC/PCC rule, instruct the TDF or PCEF enhanced with ADC, what enforcement actions to apply to the detected application traffic. The PCRF may activate application detection only if user profile configuration allows this.

In unsolicited application reporting, the TDF is pre-configured as to which applications to detect and report. The PCRF may enable enforcement in the PCEF based on the service data flow description provided to PCRF by the TDF. It is assumed that user profile configuration information indicates whether application detection and control can be enabled and is not required.

The report to the PCRF may include the same information for solicited and unsolicited application reporting, such as whether the report is for application start or stop, the detected application identifier and, if deducible, the service data flow descriptions for the detected application traffic.

For the application types, where service data flow descriptions are deducible, the Start and Stop of the application may be indicated multiple times, including the application instance identifier to inform the PCRF about the service data flow descriptions belonging to that application instance. The application instance identifier may be dynamically assigned by the TDF or by the PCEF enhanced with ADC in order to allow correlation of application Start and Stop events to the specific service data flow description.

Any one or more of subscriber devices 112 may establish respective subscriber sessions and begin sending subscriber data traffic toward core network 122 in order to access and receive services provided by PDN 124, and such packets traverse gateway device 104 as part of at least one packet flow. A subscriber session may represent an IP Connectivity Access Network (IP-CAN) session. Packet flows 116A, 116B illustrated in FIG. 1 represent one or more upstream packet flows from respective subscriber devices 112 and directed to PDN 124. The term "packet flow," "traffic flow," or simply "flow" refers to a set of packets originating from a particular source device and sent to a particular destination device as part of a communication session between the source and destination device. A flow of packets, in either the upstream (sourced by one of subscriber devices 112) or downstream (destined for one of subscriber devices 112) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Policy and charging enforcement unit 106 may determine whether traffic of a packet flow from one of subscriber devices 112 (e.g., one of packet flows 116A associated with subscriber device 112A) indicates the start of an application executed by subscriber device 112A. For example, policy and charging enforcement unit 106 may apply application detection and control (ADC) rules to packet flows 116A, 116B to detect start and/or end of applications indicated therein. In the instance that data of one or more of packet flows 116A represents the start of an application, policy and charging enforcement unit 106 generates a message indicating that subscriber device 112A has started the application and that packet flow 116A corresponds to subscriber device 112A and the application. The message may be in accordance with an authentication, authorization, and accounting (AAA) protocol, such as Diameter, and in accordance with the techniques of this disclosure. For example, the message may comprise a credit control request (CCR) message, such as a CCR update (CCR-U) message.

More particularly, at some times, gateway device 104 may determine that data of one of packet flows 116A represents the start of an application and that data of another one of packet flows 116A represents the termination (i.e., end) of another application. The packet flows may be from the same subscriber device (e.g., subscriber device 112A, where the applications are executed by subscriber device 112A and are different from each other). For example, policy and charging enforcement unit 106 may determine that one of packet flows 116A represents the start of an application by subscriber device 112A and that one of packet flows 116B represents the termination of an application by subscriber device 112A. Furthermore, one of packet flows 116A (for example) may include data indicating the start of an application by subscriber device 112A, while another of packet flows 116A may include data indicating the termination of an application (which may be the same or a different application) by subscriber device 112A.

In accordance with the techniques of this disclosure, when two application start or termination events occur in close temporal proximity, gateway device 104 may generate a single message (e.g., a single CCR-U message) indicating both that one application has started and that another application has terminated. For example, the message may include data identifying a corresponding subscriber device, packet flow, and application, as well as an indication of whether the application has started or terminated, and furthermore, may include a plurality of such indications. This allows gateway device 104 to reduce the number of CCR-U messages sent to policy control server device 102. Likewise, this reduces the number of messages to be processed by and responded to by policy control server device 102.

In other words, in some examples, gateway device 104 sends both APPLICATION_START and APPLICATION_STOP notifications via a single CCR-U message. This differs from the conventional approach in which a CCR-U is structured as follows:
    CCR-U={Mandatory AVPs}
    *[Application-Detection-Information]
    *[Event-Trigger]
To be able to send both APPLICATION_START and APPLICATION_STOP event trigger information in a single CCR-U message, a new, optional AVP: TDF-Application-Identifier-Type may be added to the Application-Detection-Information AVP:
    Application-Detection-Information::=<AVP Header: 1098>
    {TDF-Application-Identifier}
    [TDF-Application-Instance-Identifier]
    *[Flow-Information]
    [TDF-Application-Identifier-Type]
    The TDF-Application-Identifier-Type AVP may be of type enum with two values:
    0—Application started
    1—Application stopped
The TDF-Application-Identifier-Type AVP indicates whether the application mentioned in TDF-Application-Identifier AVP started or stopped. Based on that, policy control server device 102 may determine which applications started and which applications stopped from a single message, i.e., in one shot.

As an example, to report both start for an application "youtube.com" and a stop for application "facebook.com," gateway device 104 may generate a CCR-U as follows:
    CCR-U={Mandatory AVPs}
    [Application-Detection-Information1]→
    {"youtube.com"}/*TDF-Application-Identifier */
    [0]/*TDF-Application-Identifier-Type */
    [Event-Trigger1]→
    [39]/*Indicates APP_START event occurred */
    [Application-Detection-Information2]→
    {"facebook.com"}
    [1]
    [Event-Trigger2]→
    [40]/*Indicates APP_STOP event occurred */

Moreover, in some examples, gateway device 104 may determine that multiple packet flows correspond to the same application executed by the same subscriber device. For example, subscriber device 112A may send data via multiple packet flows 116 for the same application. Whereas a conventional device would send start and/or termination messages to a policy control server device representative of application starts/terminations for each of the packet flows, gateway device 104 may reduce the number of messages sent to policy control server device 102. In particular, gateway device 104 may send a CCR-U message indicating that the application has started in response to detecting the start of the application in a first packet flow from subscriber device 112A. Here, the word "first" is used in the ordinal sense, as opposed to the nominal sense, such that "first" refers to the first packet flow in time associated with subscriber device 112A and the application. Thus, gateway device 104 abstains from sending messages (e.g., CCR-U messages) including indications that subscriber device 112A has started the application for subsequent packet flows that follow the first packet flow. Similarly, gateway device 104 abstains from sending messages indicating that the application has terminated until a last packet flow associated with subscriber device 112A and the application indicates that the application has terminated.

Gateway device 104 may maintain a counter representative of a number of packet flows associated with a subscriber device and an application. For example, after determining that a packet flow from subscriber device 112A indicates that an application has started, gateway device 104 may initialize a counter associated with subscriber device 112A and the application and set the value of the counter to 1, and also send a CCR-U message to policy control server device 102 indicating that subscriber device 112A has started the application. In response to subsequent packet flows from subscriber device 112A being associated with the application, subscriber device 112A may increment the counter, but abstain from sending messages indicating that the application has started to policy control server device 102.

Similarly, when data of one of the packet flows indicates that the application has terminated, gateway device 104 may decrement the counter, and abstain from sending messages indicating that the application has terminated to policy control server device 102 until the counter is equal to zero. Thus, only after the counter has a value equal to zero would gateway device 104 send a message indicating that the application associated with subscriber device 112A has terminated. Such a message may include only the indication that the application has terminated, or may include additional data for a different application, e.g., another application started by subscriber device 112A.

In other words, gateway device 104 may notify the PCRF executed by policy control server device 102 of the start and stop of application traffic only once for every new application started/stopped by a UE (e.g., one of subscriber devices 112) in a given IPCAN session. In general, the data plane of gateway device 104 keeps track of each application detected within the UE traffic. One simple way to do this is by having a counter for each application type used by each UE. Whenever this counter transitions from 0→1, gateway device 104 may send an APPLICATION_START notification towards the PCRF executed by policy control server device 102. Similarly, whenever this counter transitions from 1→0, gateway device 104 may send an APPLICATION_STOP notification towards the PCRF executed by policy control server device 102. By doing so, gateway device 104 avoids sending APPLICATION_START/STOP notifications for every new flow created/destroyed by the UE for the same application. When this optimization is being used, policy and charging enforcement unit 106 of gateway device 104 need not encode the Flow information and Instance optional AVPs within Application-Detection-Information AVP. Also, this optimization need not be applied when flow information is deducible and sent to the PCRF executed by policy control server device 102.

Figure 2:
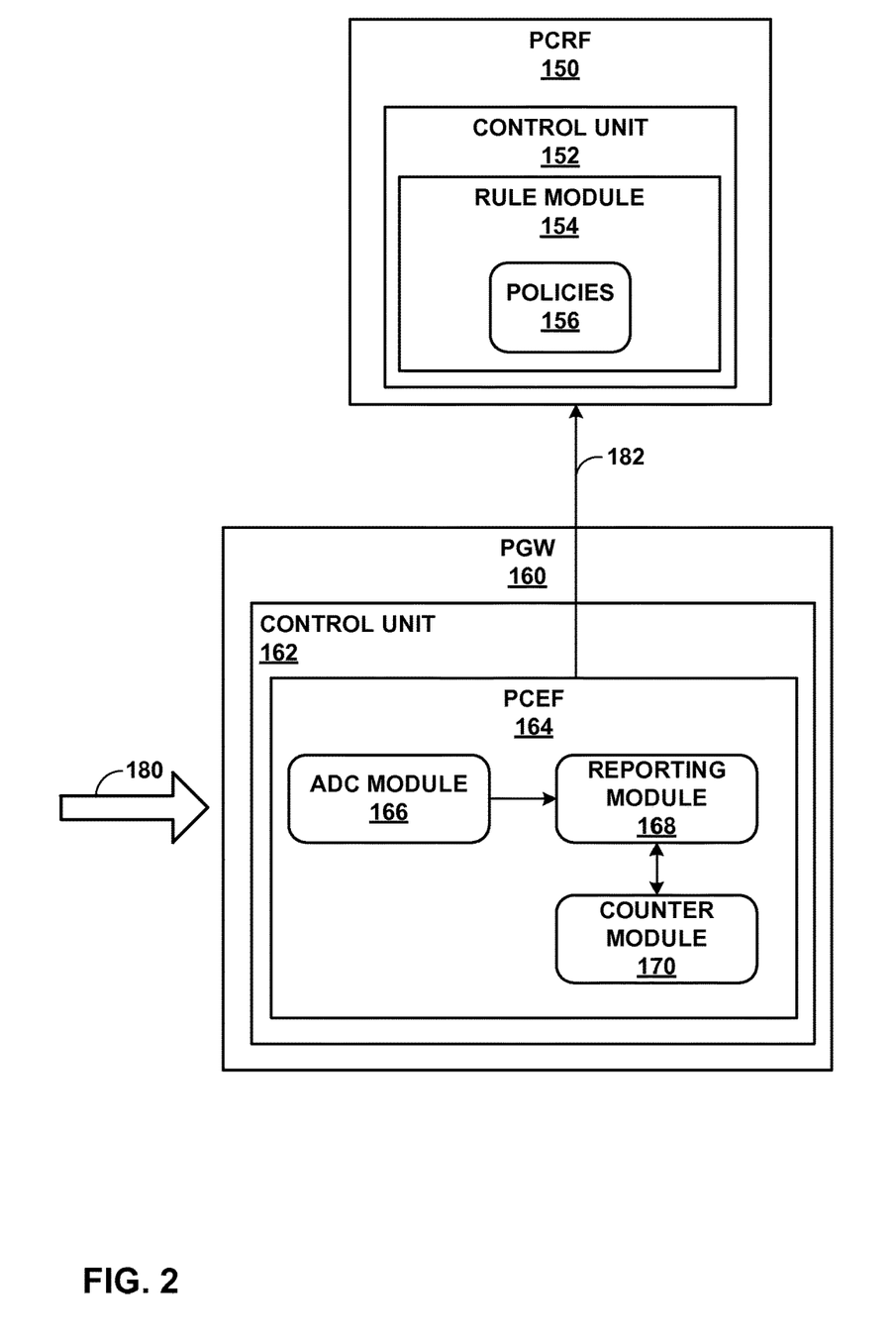
FIG. 2 is a block diagram illustrating example instances of a policy and charging rules function (PCRF) and a packet gateway (PGW).

FIG. 2 is a block diagram illustrating example instances of a PCRF 150 ("PCRF 150") and a packet gateway (PGW) 160. In general, PCRF 150 may correspond to a policy and charging rules function executed by policy control server device 102 (FIG. 1). Likewise, PGW 160 may correspond to gateway device 104 (FIG. 1). In this example, PGW 160 executes PCEF 164, which may correspond to a policy and charging enforcement function executed by gateway device 104. It should be understood that FIG. 2 merely illustrates one example, and that other gateway devices (such as, for example, a TDF gateway) may execute PCEF 164.

PCRF 150 and PGW 160 are, in this example, separate network devices that include respective control units 152 and 162. Each of control units 152 and 162 may include one or more processors or controllers (not shown in FIG. 2) that execute software instructions, such as those used to define a software or computer program, stored to a tangible computer-readable medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 152 and 162 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware. PCRF 150 and PGW 160 also each include one or more network interface cards (not shown) or other network interfaces with which to exchange control traffic and, at least in the case of PGW 160, data traffic in the form of packet flows.

Control unit 162 of PGW 160 provides an operating environment for PCEF 164 (an example instance of policy and charging enforcement unit 106 of FIG. 1) to apply policy and charging control (PCC) rules received from PCRF 150 in PCC rule installation messages to perform bearer binding, charging, reporting, credit management, and event triggering. In addition, PCEF 164 performs techniques of this disclosure for detection of application starts and/or terminations in packet flows 180 (which may generally correspond to packet flows 116 of FIG. 1).

PCEF 164 includes Application Detection and Control (ADC) module 166, reporting module 168, and counter module 170. As noted above, PGW 160 receives packet flows 180 from corresponding subscriber devices (e.g., subscriber devices 112 of FIG. 1). In this example, PCEF 164 executes ADC module 166 to detect an application associated with each of packet flows 180. After ADC module 166 determines an application associated with a packet flow (and a corresponding subscriber device), reporting module 168 may generate a message in accordance with Diameter protocol to be sent to PCRF 150, such as message 182. For example, the message may be a CCR-U message. In accordance with techniques of this disclosure, the message may include information for two or more of packet flows 180, e.g., an indication of a start of an application associated with one packet flow, and an indication of a termination of an application associated with another packet flow.

Furthermore, in some examples, reporting module 168 interacts with counter module 170, which maintains counters for pairs of applications and subscriber devices. The counters represent a number of packet flows associated with a particular subscriber device and a particular application executed by the subscriber device. For example, after ADC module 166 determines that a subscriber device has started an application via analysis of one of packet flows 180, reporting module 168 may cause counter module 170 to initialize a counter associated with the application and the subscriber device (e.g., setting an initial value of the counter to 1). In this instance, reporting module 168 may send a message (such as message 182) to PCRF 150 indicating that the subscriber device has started the application.

Subsequently, if ADC module 166 detects a separate one of packet flows 180 is associated with the same subscriber device and the same application, counter module 170 may increment the counter associated with the subscriber device and application, but reporting module 168 may abstain from sending any further messages indicating the start of the application by the subscriber device. Thus, although a subscriber device may be associated with a plurality of different packet flows, each associated with the same application, reporting module 168 may simply send a single message for the ordinal first packet flow indicating that the subscriber device has started the application.

Similarly, counter module 170 may decrement the counter associated with the application and the subscriber device when one of packet flows 180 indicates that the application has stopped (which may occur, e.g., when the packet flow terminates). Reporting module 168 may abstain from sending an indication that the application has stopped, however, until the counter associated with the subscriber device and the application has reached a value of zero. In this manner, reporting module 168 may simply send a single message for the ordinal last packet flow associated with the subscriber device and the application, where the message indicates that the application has been terminated (i.e., ended).

In this manner, this disclosure provides various techniques, which may be used alone or in any combination, that may reduce traffic between policy control server device 102 and gateway device 104. That is, in some examples, the techniques include consolidating information for a plurality of different applications (e.g., starts and/or stops of applications by a subscriber device) into a single message (e.g., a single CCR-U message). Likewise, in some examples (which may be in addition or in the alternative to the consolidation techniques), the techniques of this disclosure include sending only a single message indicating the start of an application by a particular subscriber device, and sending only a single message indicating the termination of the application by the subscriber device, even in the instance where the subscriber device exchanges data for the application in a plurality of packet flows. By reducing messaging traffic, both PCRF 150 and PGW 160 may perform more efficiently than conventional devices, in that these devices can send and receive fewer messages between each other.

Figure 3:
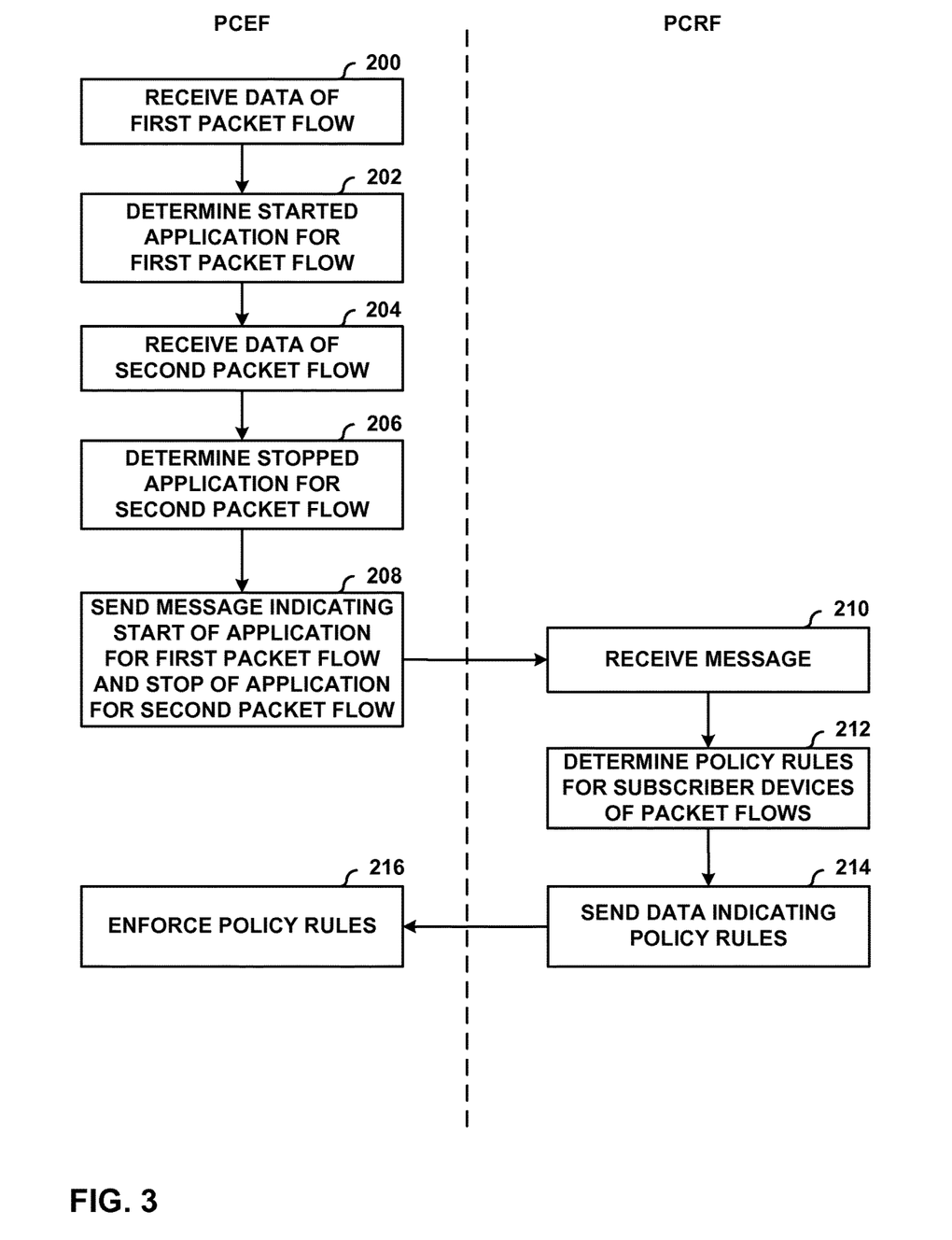
FIG. 3 is a flowchart illustrating an example method in accordance with techniques of this disclosure.

FIG. 3 is a flowchart illustrating an example method in accordance with techniques of this disclosure. In particular, in this example, a PCEF (such as PCEF 164 of FIG. 2) sends a single message to a PCRF (such as PCRF 154 of FIG. 2) including data for two different applications. Although described with respect to PCEF 164 and PCRF 154 of FIG. 2, it should be understood that other devices (such as gateway device 104 and policy control server device 102) may also be configured to perform the method of FIG. 3.

In this example, initially, PCEF 164 receives data of a first packet flow (200). PCEF 164 determines that the data indicates a started application for the first packet flow (202), along with a subscriber device associated with the first packet flow. PCEF 164 also receives data of a second packet flow (204). PCEF 164 determines that the data indicates a stopped application for the second packet flow (206). Thus, it should be understood that PCEF 164 would have previously received data indicating a start of the application for the second packet flow, although these steps are not illustrated in FIG. 3.

In accordance with the techniques of this disclosure, PCEF 164 sends a single message to PCRF 154 indicating a start of the application for the first packet flow and a stop of the application for the second packet flow (208) to PCRF 154. The message may comprise a CCR-U message as explained above with respect to FIG. 1. That is, the message may include distinct application instance identifiers for the applications, as well as information indicating whether the application has started or stopped (e.g., a TDF application identifier type).

Subsequently, PCRF 154 receives the message (210) and determines policy rules for a subscriber device of the corresponding packet flows (212). PCRF 154 then sends data indicating the policy rules to PCEF 164 (214). For example, PCRF 154 may send a credit control answer (CCA) message to PCEF 164. In response to receiving the data (e.g., CCA), PCEF 164 may enforce the policy rules.

In this manner, the method of FIG. 3 represents an example of a method including determining that a subscriber device has started a first application, determining that the subscriber device has ended a second application, and sending a message, in accordance with Diameter protocol, to a policy server device indicating both that the subscriber device has started the first application and that the subscriber device has ended the second application. The uses of "first" and "second" in these examples are in the nominative sense, rather than the ordinal sense.

Figure 4A:
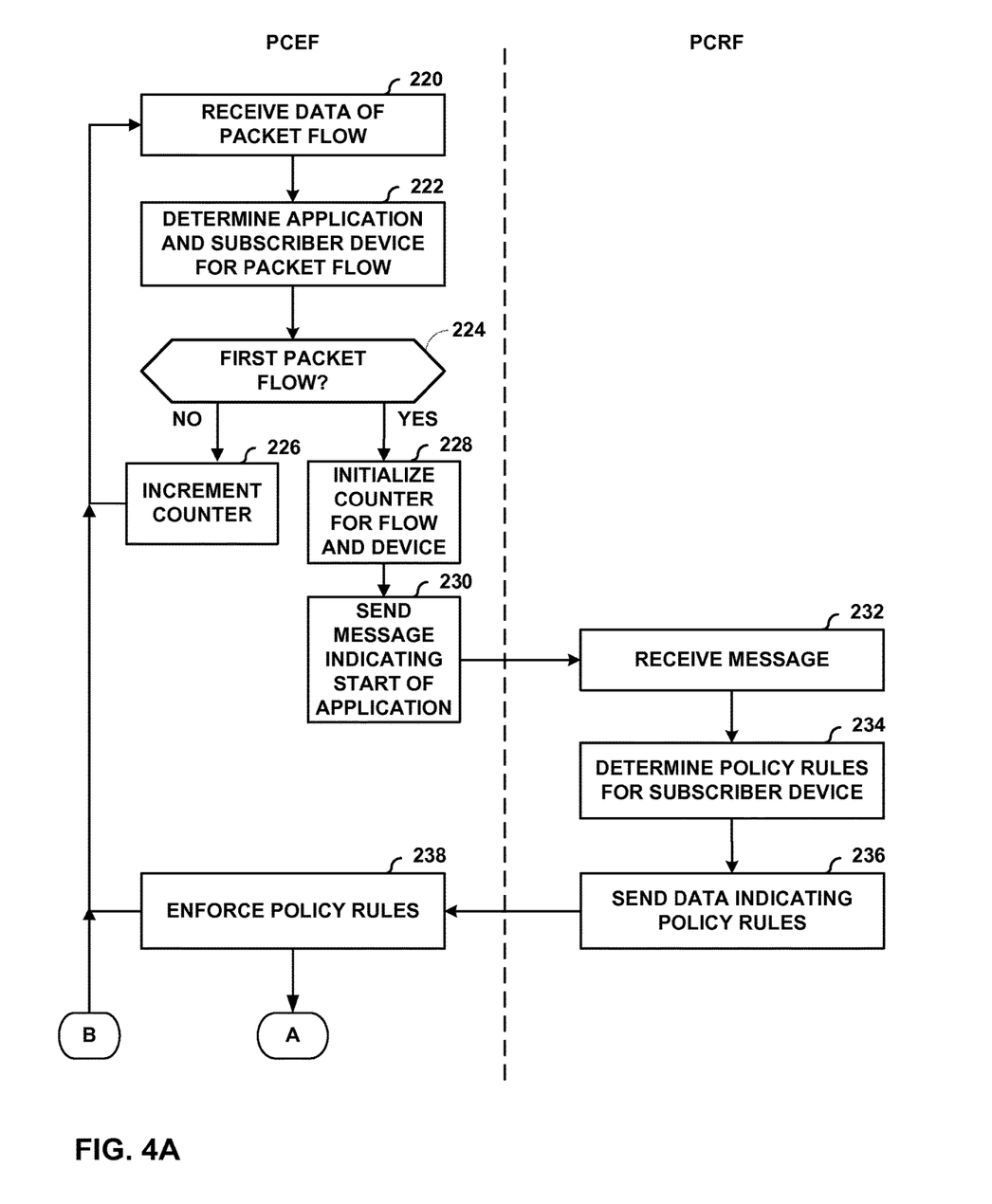
FIGS. 4A and 4B are flowcharts illustrating another example method in accordance with the techniques of this disclosure.
Figure 4B:
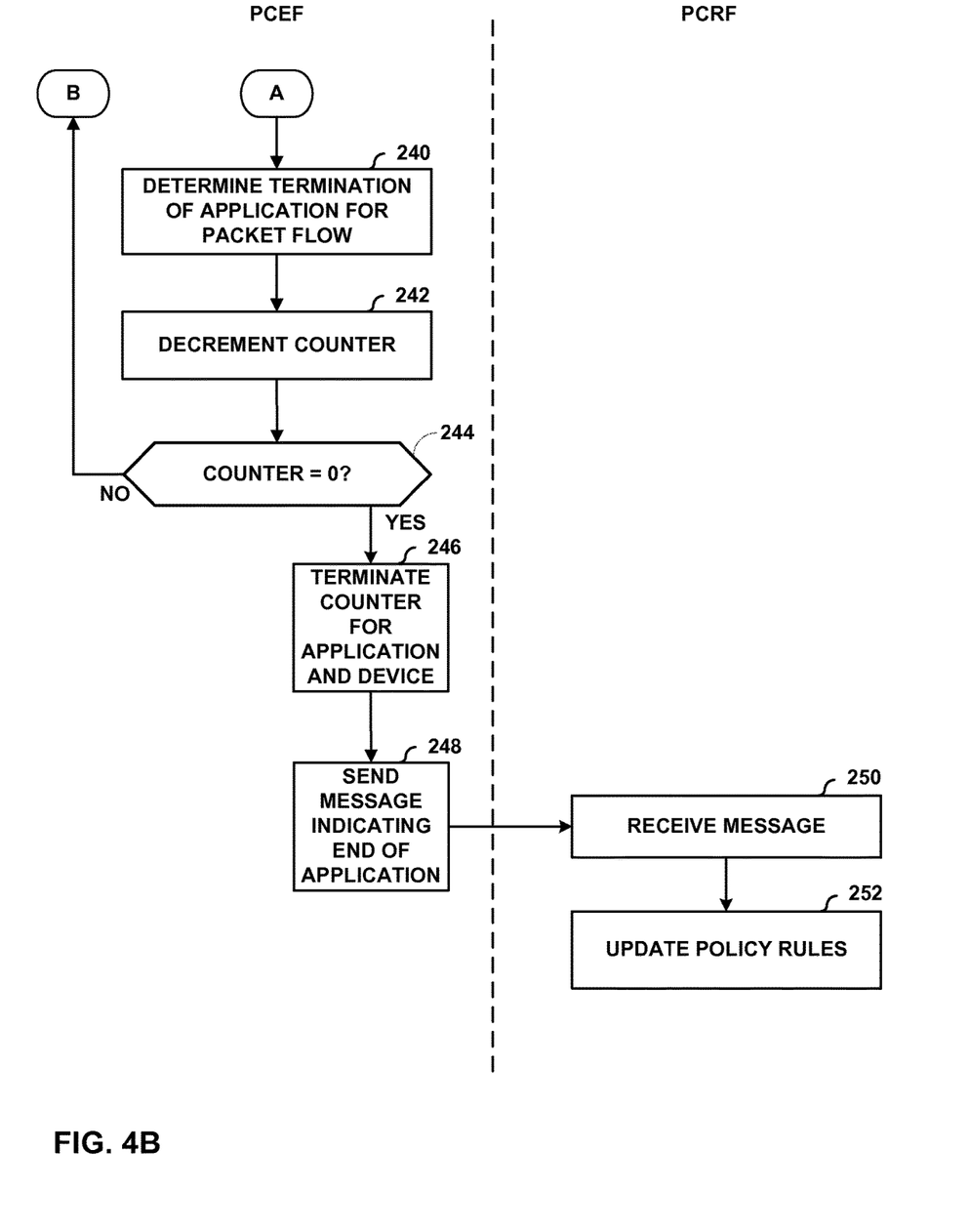

FIGS. 4A and 4B are flowcharts illustrating another example method in accordance with the techniques of this disclosure. In particular, in this example, PCEF 164 abstains from sending messages to PCRF 154 regarding packet flows including information for an associated application and subscriber device, except for an ordinal first packet flow and an ordinal last packet flow.

Initially, PCEF 164 receives data of a packet flow (220). PCEF 164 then determines an application and subscriber device for the packet flow (222). It is assumed in this instance that the data indicates that the application is starting. PCEF 164 then determines whether the packet flow is a first (i.e., an ordinal first) packet flow associated with the application and the subscriber device (224). If the packet flow is the ordinal first packet flow ("YES" branch of 224), PCEF 164 initializes a counter for the application type and the subscriber device (228), e.g., by setting a value for the counter equal to 1, and sends a message indicating that the application has started (230) to PCRF 154. On the other hand, if the packet flow is not the first packet flow ("NO" branch of 224), PCEF 164 increments the counter (226), but abstains from sending a message to PCRF 154 regarding the application.

In response to receiving the message (232) for the ordinal first packet flow associated with the application and the subscriber device, PCRF 154 determines policy rules for the subscriber device (234). PCRF 154 also sends data indicating the policy rules to PCEF 154 (236), which enforces the policy rules (238). Subsequently, PCRF 154 may receive data of additional packet flows associated with the same application and subscriber device. The data for a packet flow may indicate either that the application is starting for packet flow or (as explained with respect to FIG. 4B) that the application is terminating for the packet flow.

With respect to FIG. 4B, in the case that PCEF 164 determines that data of a packet flow indicates termination of the application for the packet flow (240), PCEF 164 decrements the counter associated with the application and the subscriber device (242). PCEF 164 then determines whether the counter has a value equal to zero (244). If the value of the counter is not equal to zero ("NO" branch of 244), PCEF 164 awaits data of existing or new packet flows associated with the application and the subscriber device, but abstains from sending messages to PCRF 154. However, if the value of the counter is equal to zero ("YES" branch of 244), PCEF 164 terminates the counter for the application and the subscriber device (246) and sends a message indicating the end of the application to PCRF 164 (248). PCRF 164, in response to receiving the message (250) updates the policy rules accordingly (252).

In this manner, the method of FIGS. 4A and 4B represents an example of a method including determining that a subscriber device has started an application in an ordinal first packet flow associated with the subscriber device and the application, sending a message, in accordance with Diameter protocol, to a policy server device indicating that the subscriber device has started the application, determining that the subscriber device has started the application in one or more subsequent packet flows associated with the subscriber device and the application, and based on the one or more subsequent packet flows being subsequent to the ordinal first packet flow, abstaining from sending messages, in accordance with the Diameter protocol, indicating that the subscriber device has started the application in the subsequent packet flows.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method performed by a gateway device for an access network by which a subscriber device accesses a packet data network, the method comprising:
   determining, by the gateway device, that the subscriber device has started a first application;
   determining, by the gateway device, that the subscriber device has ended a second application;
   constructing, by the gateway device, a single message, in accordance with Diameter protocol, indicating both that the subscriber device has started the first application and that the subscriber device has ended the second application, wherein the single message comprises one of a credit control request (CCR) message or a credit control request update (CCR-U) message; and
   sending, by the gateway device, the single message to a policy server device in accordance with the Diameter protocol.

2. The method of claim 1, wherein the first application is different than the second application.

3. The method of claim 1, wherein the CCR-U message includes:
   a first set of information that identifies the first application and that indicates that the first application has started; and
   a second set of information, different from the first set of information, that identifies the second application and that indicates that the second application has stopped.

4. The method of claim 3, wherein the first set of information that indicates that the first application has started comprises a first application identifier type, and wherein the second set of information that indicates that the second application has stopped comprises a second application identifier type.

5. The method of claim 1, wherein the CCR-U message includes:
   a first set of information including a first application identifier for the first application, a first application-instance identifier for the first application, and a first application-identifier type for the first application; and
   a second set of information including a second application identifier for the second application, a second application-instance identifier for the second application, and a second application-identifier type for the second application.

6. The method of claim 1, wherein determining that the subscriber device has started the first application comprises analyzing a first packet flow associated with the subscriber device and determining that the subscriber device has started the first application based on the analysis.

7. The method of claim 6, wherein the first packet flow comprises an ordinal first packet flow associated with the subscriber device and the first application, the method further comprising, in response to a determination that a second packet flow is associated with the subscriber device and the first application, abstaining from sending a second message, in accordance with the Diameter protocol, indicating that the subscriber device has started the first application.

8. The method of claim 6, further comprising maintaining a counter representative of a number of packet flows associated with the subscriber device and the first application.

9. The method of claim 8, wherein maintaining the counter comprises:
   incrementing the counter in response to determining that a new packet flow associated with the subscriber device and the first application has started; and decrementing the counter in response to determining that an existing packet flow associated with the subscriber device and the first application has ended.

10. The method of claim 8, further comprising sending a second message, only after the counter reaches zero and in accordance with the Diameter protocol, to the policy server device indicating that the first application on the subscriber device has ended.

11. The method of claim 1, wherein determining that the subscriber device has started the first application comprises applying an application detection and control (ADC) rule to a packet flow associated with the subscriber device and the first application.

12. The method of claim 1, wherein determining that the subscriber device has ended the second application comprises receiving an application termination indication in a second packet flow associated with the subscriber device.

13. The method of claim 12, wherein the second packet flow comprises an ordinal last packet flow associated with the subscriber device and the second application, the method further comprising, in response to a determination that a third packet flow included an application termination indication before the application termination indication of the second packet flow, abstaining from sending a second message, in accordance with the Diameter protocol, indicating that the subscriber device has ended the second application.

14. The method of claim 12, further comprising maintaining a counter representative of a number of packet flows associated with the subscriber device and the second application.

15. The method of claim 14, wherein maintaining the counter comprises:
incrementing the counter in response to determining that a new packet flow associated with the subscriber device and the first application has started; and
decrementing the counter in response to determining that an existing packet flow associated with the subscriber device and the first application has ended.

16. The method of claim 14, wherein sending the first message comprises sending the first message indicating that the subscriber device has ended the second application only after the counter reaches zero.

17. A gateway device for an access network by which a subscriber device accesses a packet data network, the gateway device comprising:
one or more network interfaces configured to receive data of packet flows from a plurality of subscriber devices including the subscriber device, and to exchange messages, in accordance with Diameter protocol, with a policy server device; and
one or more processing units configured to:
determine, from data of a first packet flow of the packet flows, that the subscriber device has started a first application,
determine, from data of a second packet flow of the packet flows, that the subscriber device has ended a second application,
construct a single message, in accordance with the Diameter protocol, indicating both that the subscriber device has started the first application and that the subscriber device has ended the second application, wherein the single message comprises one of a credit control request (CCR) message or a credit control request update (CCR-U) message; and
send the single message to a policy server device in accordance with the Diameter protocol.

18. The device of claim 17, wherein the CCR-U message includes:
a first set of information that identifies the first application and that indicates that the first application has started; and
a second set of information, different from the first set of information, that identifies the second application and that indicates that the second application has stopped.

19. The device of claim 18, wherein the first set of information that indicates that the first application has started comprises a first application identifier type, and wherein the second set of information that indicates that the second application has stopped comprises a second application identifier type.

20. The device of claim 17, wherein the one or more processing units are configured to apply an application detection and control (ADC) rule to the packet flows to determine whether the packet flows include information indicating that applications associated with the packet flows have started or ended.

21. The device of claim 17, wherein the first packet flow comprises an ordinal first packet flow associated with the subscriber device and the first application, and wherein the one or more processing units are configured to, in response to determining that a subsequent packet flow is associated with the subscriber device and the first application, abstain from sending a second message, in accordance with the Diameter protocol, indicating that the subscriber device has started the first application, to the policy server device.

22. The device of claim 17, wherein the second packet flow comprises an ordinal last packet flow associated with the subscriber device and the second application, and wherein the one or more processing units are configured to, in response to determining that an earlier packet flow associated with the second application and the subscriber device included an application termination indication before the application termination indication of the second packet flow, abstain from sending a second message, in accordance with the Diameter protocol, indicating that the subscriber device has ended the second application.

23. The device of claim 17, wherein the one or more processors are configured to maintain counters representative of numbers of packet flows associated with the subscriber devices and the applications.

24. The device of claim 17, wherein the gateway device comprises one of a packet data network gateway (PGW), a gateway general packet radio service (GPRS) support node, or a traffic detection function (TDF) device.

25. A non-transitory computer-readable storage medium having stored thereon instructions that, when executed, cause a processor of a gateway device, for an access network by which a subscriber device accesses a packet data network, to:
determine that the subscriber device has started a first application;
determine that the subscriber device has ended a second application;
construct a single message, in accordance with Diameter protocol, indicating both that the subscriber device has started the first application and that the subscriber device has ended the second application, wherein the single message comprises one of a credit control request (CCR) message or a credit control request update (CCR-U) message; and
send the single message to a policy server device in accordance with the Diameter protocol.

26. The non-transitory computer-readable storage medium of claim 25, wherein the CCR-U message includes:
   a first set of information that identifies the first application and that indicates that the first application has started; and
   a second set of information, different from the first set of information, that identifies the second application and that indicates that the second application has stopped.

27. The non-transitory computer-readable storage medium of claim 26, wherein the first set of information that indicates that the first application has started comprises a first application identifier type, and wherein the second set of information that indicates that the second application has stopped comprises a second application identifier type.

28. The non-transitory computer-readable storage medium of claim 25, wherein the instructions that cause the processor to determine that the subscriber device has started the first application and to determine that the subscriber device has ended the second application comprise instructions that cause the processor to apply an application detection and control (ADC) rule to packet flows associated with the subscriber device to determine whether the packet flows include information indicating that applications associated with the packet flows have started or ended.

29. The non-transitory computer-readable storage medium of claim 25, wherein the instructions that cause the processor to determine that the subscriber device has started the first application comprise instructions that cause the processor to determine that the subscriber device has started the first application using data of a first packet flow comprising an ordinal first packet flow associated with the subscriber device and the first application, further comprising instructions that cause the processor to, in response to determining that a subsequent packet flow is associated with the subscriber device and the first application, abstain from sending a second message, in accordance with the Diameter protocol, indicating that the subscriber device has started the first application, to the policy server device.

30. The non-transitory computer-readable storage medium of claim 25, wherein the instructions that cause the processor to determine that the subscriber device has ended the second application comprise instructions that cause the processor to determine that the subscriber device has ended the second application using data of a second packet flow comprising an ordinal last packet flow associated with the subscriber device and the second application, further comprising instructions that cause the processor to, in response to determining that an earlier packet flow associated with the second application and the subscriber device included an application termination indication before an application termination indication of the second packet flow, abstain from sending a second message, in accordance with the Diameter protocol, indicating that the subscriber device has ended the second application.

31. The non-transitory computer-readable storage medium of claim 25, wherein the one or more processors are configured to maintain counters representative of numbers of packet flows associated with the subscriber devices and the applications.

32. A method performed by a gateway device for an access network by which a subscriber device accesses a packet data network, the method comprising:
   determining, by the gateway device, that a subscriber device has started an instance of an application in an ordinal first packet flow associated with the subscriber device and the instance of the application;
   constructing, by the gateway device, a message, in accordance with Diameter protocol, indicating that the subscriber device has started the instance of the application, wherein the message comprises one of a credit control request (CCR) message or a credit control request update (CCR-U) message;
   sending, by the gateway device, the message to a policy server device;
   determining, by the gateway device, that the subscriber device has started the instance of the application in one or more subsequent packet flows associated with the subscriber device and the instance of the application; and
   based on the one or more subsequent packet flows being subsequent to the ordinal first packet flow, abstaining, by the gateway device, from sending any additional CCR or CCR-U messages, in accordance with the Diameter protocol, to the policy server device indicating that the subscriber device has started the instance of the application in the subsequent packet flows at any time.

33. The method of claim 32, further comprising maintaining a counter representative of a number of packet flows associated with the subscriber device and the instance of the application.

34. The method of claim 33, wherein maintaining the counter comprises:
   incrementing the counter in response to determining that a new packet flow associated with the subscriber device and the instance of the application has started; and
   decrementing the counter in response to determining that an existing packet flow associated with the subscriber device and the instance of the application has ended.

35. The method of claim 33, wherein the message comprises a first message, the method further comprising sending a second message, only after the counter reaches zero and in accordance with the Diameter protocol, to the policy server device indicating that the subscriber device has stopped the instance of the application.

36. The method of claim 32, wherein the message comprises a first message, the method further comprising sending a second message, in accordance with the Diameter protocol, to the policy server device indicating that the subscriber device has stopped the instance of the application.

37. The method of claim 36, wherein sending the second message comprises sending the second message only for an ordinal last packet flow associated with the subscriber device and the instance of the application.

* * * * *